United States Patent [19]

Zones

[11] Patent Number: 4,589,977

[45] Date of Patent: May 20, 1986

[54] ZEOLITE SSZ-19

[75] Inventor: Stacey I. Zones, San Francisco, Calif.

[73] Assignee: Chevron Research Company, San Francisco, Calif.

[21] Appl. No.: 692,942

[22] Filed: Jan. 17, 1985

Related U.S. Application Data

[62] Division of Ser. No. 494,244, May 13, 1983, Pat. No. 4,510,256.

[51] Int. Cl.$^4$ ............................................. C10G 47/16
[52] U.S. Cl. .................................................... 208/111
[58] Field of Search .......................................... 208/111

[56] References Cited

U.S. PATENT DOCUMENTS

| | | | |
|---|---|---|---|
| 4,229,282 | 10/1980 | Peters et al. | 208/111 |
| 4,269,697 | 5/1981 | Chen et al. | 208/111 |
| 4,299,686 | 11/1981 | Kuehl | 208/111 |
| 4,309,278 | 1/1982 | Sawyer | 208/111 |
| 4,401,556 | 8/1983 | Bezman et al. | 208/111 |
| 4,437,975 | 3/1984 | Gillespie et al. | 208/111 |
| 4,439,310 | 3/1984 | Audeh et al. | 208/111 |

*Primary Examiner*—John Doll
*Assistant Examiner*—Anthony McFarlane
*Attorney, Agent, or Firm*—S. R. LaPaglia; W. K. Turner; V. J. Cavalieri

[57] ABSTRACT

A crystalline, siliceous composition is prepared from bicyclic ammonium compounds.

2 Claims, No Drawings

ZEOLITE SSZ-19

This is a division of application Ser. No. 494,244, filed May 13, 1983, now U.S. Pat. No. 4,510,256.

BACKGROUND OF THE INVENTION

Natural and synthetic zeolitic crystalline aluminosilicates are useful as catalysts and adsorbents. These aluminosilicates have distinct crystal structures which are demonstrated by X-ray diffraction. The crystal structure defines cavities and pores which are characteristic of the different species. The adsorptive and catalytic properties of each crystalline aluminosilicate are determined in part by the dimensions of its pores and cavities. Thus, the utility of a particular zeolite in a particular application depends at least partly on its crystal structure.

Because of their unique molecular sieving characteristics, as well as their catalytic properties, crystalline aluminosilicates are especially useful in such applications as gas drying and separation and hydrocarbon conversion. Although many different crystalline aluminosilicates and silicates have been disclosed, there is a continuing need for new zeolites and silicates with desirable properties for gas separation and drying, hydrocarbon and chemical conversions, and other applications.

Crystalline aluminosilicates are usually prepared from aqueous reaction mixtures containing alkali or alkaline earth salts, silica, and alumina. "Nitrogenous zeolites" have been prepared from reaction mixtures containing an organic templating agent, usually a nitrogen-containing organic cation. By varying the synthesis conditions and the composition of the reaction mixture, different zeolites can be formed using the same templating agent. Use of N,N,N-trimethyl cyclopentylammonium iodide in the preparation of Zeolite SSZ-15 molecular sieve is disclosed in my copending Application Ser. No. 437,709, filed on Oct. 29, 1982. Use of 1-azoniaspiro[4.4]nonyl bromide and N,N,N-trimethyl neopentylammonium iodide in the preparation of a molecular sieve termed "Losod" is disclosed in *Helv. Chim. Acta* (1974); Vol. 57, page 1533 (W. Sieber and W. M. Meier). Use of quinuclidinium compounds to prepare a zeolite termed "NU-3" is disclosed in European Patent Publication No. 40016. Use of 1,4-di(1-azoniabicyclo[2.2.2]octane) lower alkyl compounds in the preparation of Zeolite SSZ-16 molecular sieve is disclosed in my copending Application Ser. No. 425,786, filed on Sept. 28, 1982.

SUMMARY OF THE INVENTION

I have prepared a family of crystalline aluminosilicate molecular sieves with unique properties, referred to herein as "Zeolite SSZ-19", or simply "SSZ-19", and have found a highly effective method for preparing SSZ-19.

SSZ-19 has a mole ratio of an oxide selected from silicon oxide, germanium oxide, and mixtures thereof to an oxide selected from aluminum oxide, gallium oxide, and mixtures thereof greater than about 5:1 and has the characteristic X-ray diffraction lines of Table 1. SSZ-19 has a composition, as synthesized and in the anhydrous state, in terms of mole ratios of oxides, as follows: (0.5 to 1.0)$R_2O$:(0 to 0.50)$M_2O$:$W_2O_3$:(greater than 6)$YO_2$ wherein M is an alkali metal cation, W is selected from aluminum, gallium, and mixtures thereof, Y is selected from silicon, germanium and mixtures thereof, and R is an organic cation.

One preferred form of SSZ-19 is a zeolitic crystalline aluminosilicate having a $SiO_2:Al_2O_3$ mole ratio greater than about 6:1. The as-synthesized silica:alumina mole ratio is typically above about 10:1. The silica:alumina mole ratio of SSZ-19 can be increased by standard acid leaching or chelating techniques and by using silicon and carbon halides and similar compounds. By use of such known methods for removing aluminum from the crystal structure, essentially aluminum-free forms of SSZ-19 can be prepared. Preferably, for adsorption and drying uses, SSZ-19 is employed in the form of an aluminosilicate.

SSZ-19 crystals may be prepared by a highly efficient method comprising forming an aqueous mixture containing sources of an organic nitrogen-containing compound as defined herein, an oxide selected from aluminum oxide, gallium oxide, and mixtures thereof, and an oxide selected from silicon oxide, germanium oxide, and mixtures thereof, and having a composition, in terms of mole ratios of oxides, falling within the following ranges: $YO_2/W_2O_3$, above 6:1; $R_2O/W_2O_3$, 0.5:1 to 40:1; and $OH^-/YO_2$, greater than about 0.80:1; wherein Y is selected from silicon, germanium, and mixtures thereof, W is selected from aluminum, gallium and mixtures thereof, and R is an organic cation; maintaining the mixture at a temperature of at least 110° C. until the crystals of SSZ-19 are formed; and recovering said crystals. My method for preparing SSZ-19 is notable in using a combination of relatively high hydroxide contents and relatively high $SiO_2/Al_2O_3$ ratios in the reaction mixture.

DETAILED DESCRIPTION OF THE INVENTION

SSZ-19 possesses a crystalline structure having an X-ray powder diffraction pattern with the characteristic lines as shown in Table 1.

TABLE 1

| 2 θ | d/n | Relative Intensity |
|---|---|---|
| 7.88 | 11.22 | 22 |
| 11.72 | 7.55 | 50 |
| 13.64 | 6.49 | 40 |
| 15.84 | 5.59 | 13 |
| 18.00 | 4.93 | 70 |
| 19.20 | 4.62 | 40 |
| 20.90 | 4.25 | 12 |
| 22.68 | 3.92 | 100 |
| 23.75 | 3.75 | 56 |
| 27.40 | 3.25 | 70 |
| 30.00 | 2.98 | 16 |
| 30.70 | 2.91 | 22 |

Typical specific SSZ-19 aluminosilicate preparations, as synthesized, have the X-ray diffraction patterns of Tables 2, 3 and 5.

The X-ray powder diffraction patterns shown in the Tables were determined by standard techniques. The radiation was the K-alpha/doublet of copper. A scintillation counter spectrometer with a strip-chart pen recorder was used. The peak heights I and the positions, as a function of 2 θ where θ is the Bragg angle, were read from the spectrometer chart. From these measured values, the relative intensities, $100I/I_0$ (where $I_0$ is the intensity of the strongest line or peak, and d, the interplanar spacing in Angstroms corresponding to the recorded lines) can be calculated.

SSZ-19, as synthesized, and as modified by exchanging the original SSZ-19 cations with various other cations or removing aluminum from the crystalline lattice, yields substantially the same diffraction pattern. There can be minor shifts in interplanar spacing and minor variations in relative intensity due to one or more of such variables as (1) template compound employed, (2) silica:alumina mole ratio, and (3) calcining technique. Notwithstanding such minor variations, the diffraction pattern of the basic crystal lattice structure remains essentially the same.

SSZ-19 crystals can be suitably prepared from an aqueous solution containing sources of an alkali metal oxide, an organic compound of the type specified herein, an oxide of aluminum or gallium, or mixture of the two, and an oxide of silicon or germanium, or mixture of the two. The reaction mixture should have a composition in terms of mole ratios of oxides falling within the following ranges:

|  | Broad | Preferred |
| --- | --- | --- |
| $YO_2/W_2O_3$ | >6 | >15 |
| $M_2O/W_2O_3$ | 1–50 | 10–30 |
| $R_2O/W_2O_3$ | 0.5–40 | 5–25 |
| $OH^-/YO_2$ | >0.80 | 0.95–1.1 | where R is an organic cation derived from a compound of the type specified herein, Y is silicon, germanium or both, and W is aluminum, gallium or both. M is an alkali metal, preferably sodium. The organic compound employed can provide hydroxide ion.

"Essentially alumina-free", as used herein with reference to a crystalline silica polymorph having the SSZ-19 crystal structure (an essentially alumina-free, silicaceous, crystalline molecular sieve), means a material having a silica:alumina mole ratio of greater than 200:1, preferably greater than 500:1, and more preferably greater than 1000:1.

The organic template component added to the reaction mixture used for crystallization can be a cycloalkyl trimethyl heteroatom compound. The heteroatom can be nitrogen or phosphorus. The preferred organic species are compounds which are sources of cyclohexyl trimethylammonium cations or cyclopentyl trimethylammonium cations. The cyclopentyl trimethylammonium cation sources are especially preferred compounds for use in preparing the reaction mixture.

The organic templating component can also be provided by addition to the reaction mixture of 1-azoniaspiroalkyl compounds. 1-Azoniaspiro[4.4]nonane is especially preferred. The organic templating component can also be 1-azoniabicyclo[2.2.2]octane lower alkyl compounds, especially sources of 1-azoniabicyclo[2.2.2]octane ethyl halides. The organic species can also be 2,2-methyl lower alkyl trimethylammonium compounds such as 2,2-dimethyl propyl trimethylammonium compounds.

The reaction mixture may be prepared using standard techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica, tetraalkyl orthosilicates, and silica hydroxides. Gallium and germanium can be added in forms corresponding to their aluminum and silicon counterparts. Salts, including alkali metal halides such as sodium chloride, can be added to the reaction mixture.

The reaction mixture is maintained at an elevated temperature until the crystals of the zeolite are formed. The reaction mixture temperature during hydrothermal crystallization is typically in the range from about 110° C. to about 200° C., preferably from about 130° C. to about 180° C., and most preferably from about 135° C. to about 165° C. The crystallization period is typically greater than 1 day and preferably from about 3 days to about 50 days.

The hydrothermal crystallization is usually conducted under pressure. Crystallization is usually carried out in an autoclave in which the reaction mixture is subject to autogenous pressure. The reaction mixture can be stirred during crystallization.

Once the zeolite crystals have formed, the solid product is separated from the reaction mixture by any useful mechanical separation technique, such as filtration. The crystals should usually be washed with water and dried (e.g., at 90° C. to 150° C. for from 8 to 24 hours, usually at atmospheric or subatmospheric pressure) to provide the as-synthesized SSZ-19 zeolite crystals.

During crystallization, the SSZ-19 crystals can be allowed to nucleate spontaneously from the reaction mixture. The reaction mixture can also be seeded with SSZ-19 crystals to direct and accelerate the crystallization and minimize the formation of aluminosilicate contaminants. If the reaction mixture is seeded with SSZ-19 crystals, the concentration of the organic templating agent can be greatly reduced, but it is preferred to include some templating agent in the reaction mixture.

SSZ-19 can be used as synthesized or can be thermally treated (calcined). Calcination involves heating in air or other oxygen-containing gas at a temperature of about 300° C. to about 820° C. or more, preferably from about 450° C. to about 700° C. The zeolite can be leached with chelating agents (e.g., EDTA) or with dilute acid solutions to increase the silica:alumina mole ratio. The zeolite can also be steamed. Steaming can help to stabilize the crystalline lattice against attack from acids. For catalytic use, it is usually desirable to replace the original alkali metal cation with hydrogen, ammonium, or a less basic metal ion. Typical metal cations for replacing sodium by ion-exchange into the SSZ-19 crystal structure include, e.g., rare earth, Group IIA and Group VIII metals, as well as their mixtures. Cations of the rare earths, Mn, Ca, Mg, Zn, Cd, Pt, Pd, Ni, Co, Ti, Al, Sn, Fe and Co are particularly preferred. SSZ-19 can also be composited with metals by impregnation or be otherwise intimately admixed with the zeolite using standard methods. Metals can be occluded in the crystal lattice by having the desired metals present as ions in the reaction mixture from which the SSZ-19 is prepared. Especially useful metals for combination with SSZ-19 include platinum, palladium, cobalt, nickel, molybdenum, tungsten, chromium, zinc, cadmium, manganese, vanadium and rhenium.

Conventional ion-exchange techniques can be used to introduce metals by ion exchange. Normally the SSZ-19 is contacted with an aqueous solution of the desired replacing cation or cations. Although a wide variety of salts can be employed, halides, especially chlorides, nitrates, and sulfates are particularly preferred. Ion exchange can be carried out either before or after the zeolite is calcined. Following contact with a salt solution of the desired replacing cation, the zeolite is typically washed with water and dried at a temperature in the range of from 65° C. to about 315° C. After washing and drying, the zeolite can be calcined in air or inert gas at a temperature in the range of from about 200° C. to 820° C. for a period of time ranging from 1 to 48 hours, or more, to produce an active product especially useful in adsorption and catalysis. The exchange of cations has little, if any, effect on the zeolite lattice structures.

Depending on the desired use, SSZ-19 crystals can be provided in the form of a powder, granules, or shaped particles. In cases where the material is shaped, e.g., by pelleting or extrusions, it may be shaped before drying or may be dried or partially dried and then shaped.

The SSZ-19 crystals can be composited with other materials, particularly refractory inorganic oxides which are resistant to the temperatures and other conditions employed in dessication, adsorption and catalysis. Such materials are useful for providing a matrix or binder for SSZ-19 crystals. The binder may be active or inactive for adsorption or catalysis. Suitable materials may include other synthetic or naturally occurring molecular sieves, but are usually amorphous refractory inorganic materials such as naturally occurring and synthetic clays, silica and alumina. Alumina is a preferred binder. Suitable noncrystalline inorganic oxides may be naturally occurring or may be synthesized in the form of gelatinous precipitates, sols, or gels, including mixtures of silica and metal oxides.

Use of known catalytically active materials in combination with SSZ-19 in a catalyst can improve the overall properties of the catalyst. Catalytically inactive matrix or binder materials can serve as diluents to control the rate of catalytic conversion.

In addition to single component synthetic binders such as silica, alumina, titania, and magnesia, SSZ-19 can be composited with multi-component binders such as silica-alumina, silica-magnesia, silica-zirconia, silica-thoria, silica-beryllia, silica-titania, titania-zirconia, silica-alumina-thoria, silica-alumina-zirconia, silica-alumina-magnesia and silica-magnesia-zirconia. A matrix can be provided in the form of a gel or cogel.

Other natural and synthetic zeolites with which SSZ-19 may be composited include, for example, faujasites (e.g., X and Y), erionites, mordenites, and ZSM-5. The combination of zeolites can also be composited with the porous inorganic matrix materials discussed above.

SSZ-19 is useful, for example, in catalysis and adsorption operations. SSZ-19 may be employed in hydrocarbon conversion processes in which carbon-containing compounds are changed to different carbon-containing compounds. Examples of hydrocarbon conversion processes include catalytic cracking, hydrocracking, and olefin and aromatics formation, isomerization of alkylaromatics, n-paraffins and naphthenes, oligomerization and polymerization of olefinically unsaturated compounds such as isobutylene and butene-1, naphtha reforming, aromatics and isoparaffins alkylation, and disproportionation of alkylaromatics, such as forming benzene and xylenes, and higher methylbenzenes from toluene.

SSZ-19 can be used in conversion of hydrocarbonaceous feedstocks derived from many different sources such as petroleum, shale oil, liquefied coal and tar sand bitumen. Depending on prior processing and the type of processing to be carried out, the feed may contain metals, nitrogen and/or sulfur, or be free of metals, nitrogen and/or sulfur. In general, processing with SSZ-19 is more efficient (and the catalyst more active) when the metal, nitrogen, and sulfur contents of the feedstock are low.

Processes for conversion of hydrocarbonaceous feeds can be carried out in any conventional manner, e.g., fluidized bed, moving bed, or fixed bed operations.

Using catalysts containing an SSZ-19 component and a hydrogenation component, heavy petroleum residual stocks, cycle stocks, and other hydrocrackable charge stocks can be hydrocracked at hydrocracking conditions including a temperature in the range of from 175° C. to 485° C., molar ratios of hydrogen to hydrocarbon charge from 1 to 100, a pressure in the range of from 0.5 to 350 bar, and a liquid hourly space velocity (LHSV) in the range of from 0.1 to 30. For these purposes, the SSZ-19 catalyst can be composited with mixtures of inorganic oxide supports as well as with faujasites such as X and Y.

SSZ-19 can also be used for naphtha reforming at reforming conditions including a temperature in the range of from 315° C. to 595° C., a pressure in the range of from 30 to 100 bar, and an LHSV in the range of from 0.1 to 20. The naphtha reforming may be carried out at a hydrogen to hydrocarbon mole ratio in the range of from 1 to 20.

SSZ-19 can be used to hydroisomerize normal paraffins when provided with a hydrogenation component, e.g., platinum. Hydroisomerization conditions include a temperature in the range of from 90° C. to 370° C., an LHSV in the range of from 0.01 to 5, and a hydrogen to hydrocarbon mole ratio in the range of from about 1:1 to about 5:1. SSZ-19 can also be used to isomerize and polymerize olefins.

Other processes which can be carried out using catalysts containing SSZ-19 and hydrogenation metals such as platinum, include hydrogenation, dehydrogenation, denitrogenation, and desulfurization reactions.

SSZ-19 is particularly useful as an absorbent or adsorbent and dessicant for, e.g., removing water from gas streams. It can also be used as a filler in paint and paper products, and a water-softening agent in detergents. Suitable absorption conditions for use with SSZ-19 include a temperature of 0° C. to 300° C. and a pressure of atmospheric or higher.

The following examples illustrate the preparation and use of SSZ-19.

EXAMPLES

EXAMPLE 1

Preparation of N,N,N-Trimethyl Cyclopentyl Ammonium Iodide

250 Grams of cyclopentyl amine (Aldrich Chem.), 1090 grams of tributylamine (Aldrich Chem.), and 2.5 liters of N,N-dimethylformamide were mixed in a 5-liter, round-bottom flask with stirring and cooling in an ice bath. 1251 Grams of methyl iodide were added dropwise to the cooled solution which was stirred overnight and allowed to come to room temperature. The crystals were collected by filtration and washed with acetone. More crystals were recovered by adding diethyl ether until immiscible phases formed, then adding just enough acetone to return to one phase, then chilling. The product obtained, N,N,N-trimethyl cyclopentyl ammonium iodide, was correct according to microanalysis.

EXAMPLE 2

Preparation of 1-Azoniaspiro[4.4]Nonyl Bromide

The procedure used was basically that of Blicker et al. JACS, 76, 5099 (1954), incorporated herein by specific reference, with a few modifications as noted. 40.8 grams (0.189 moles) of 1,4-dibromobutane (Aldrich), 7.56 grams of solid NaOH (0.189 moles) and 189 ml $H_2O$ were refluxed. Over ½ hour, 13.4 grams of pyrrolidone (Aldrich) were added dropwise to the refluxing mixture. Refluxing continued for another ½ hour. The mixture was cooled in an ice/salt bath (ca. $-10°$ C.) while stirring. 94.5 Ml of cold 40% NaOH solution were added and an oil precipitated. The oil was extracted into chloroform; the aqueous phase was concentrated and more oil extracted into chloroform. After drying with $MgSO_4$, the chloroform was removed and the oil was crystallized in the cold from a mixed solvent system of acetonitrile and tetrahydrofuran. The product salt was filtered rapidly under a cover of ether as the compound is hygroscopic. Microanalysis was correct for the desired product.

EXAMPLE 3

Preparation of N-Ethyl Quinuclidinium Iodide 20 grams of Quinuclidine (1 Aza bicyclo [2.2.2]octane, Aldrich) were dissolved in 100 ml of chloroform with stirring and cooling in an ice bath. 28.08 Grams of ethyl iodide (Aldrich) were added dropwise. The mixture became cloudy and was stirred overnight, slowly coming to room temperature. Acetone was added to the solution and then, with stirring, diethyl ether was added dropwise until crystals formed. The filtered solids were washed with acetone and dried under vacuum. The product had the correct microanalysis for C, H, and N.

EXAMPLE 4

Preparation of N,N,N-Trimethyl Neopentylammonium Iodide 11.51 Grams of neopentylamine (Aldrich), 48.7 grams of tributyl amine and 100 ml of DMF were mixed and cooled. 56 Grams of methyl iodide (Aldrich) were added dropwise and the reaction was carried out and worked up as in Example 1.

EXAMPLE 5

Synthesis of SSZ-19 Using Template From Example 3

2.31 Grams of the template in Example 3, 5 grams of sodium silicate solution (Banco "N" silicate, $Na_2O=9.08\%$, $SiO_2=29.22\%$), and 6 grams of $H_2O$ were mixed in a teflon cup for a Parr 4545 reactor. A second solution of 0.50 grams of $Al_2(SO_4)_3.18H_2O$, 0.85 grams of concentrated NaOH solution, and 6 ml of $H_2O$ was added with stirring. The reactor was sealed and heated at 150° C. for 6 days with reactor stirring at about 30 rpm. Upon cooling to room temperature, the product was filtered and washed with $H_2O$ five times. Air drying produced a powder whose X-ray diffraction pattern is that shown in Table 2.

TABLE 2

| 2 θ | d/n | Relative Intensity |
|---|---|---|
| 7.88 | 11.22 | 11 |
| 8.72 | 10.14 | 3 |
| 11.72 | 7.55 | 25 |
| 13.68 | 6.47 | 15 |
| 15.84 | 5.59 | 13 |
| 16.26 | 5.45 | 4 |
| 17.41 | 5.09 | 3 |
| 18.00 | 4.93 | 46 |
| 18.40 | 4.82 | 2 |
| 19.18 | 4.63 | 24 |
| 20.92 | 4.25 | 8 |
| 22.68 | 3.92 | 61 |
| 23.76 | 3.74 | 32 |
| 26.08 | 3.42 | 12 |
| 27.42 | 3.25 | 42 |
| 28.66 | 3.11 | 1 |
| 30.00 | 2.98 | 8 |
| 30.74 | 2.91 | 12 |

EXAMPLE 6

5.09 Grams of "N" silicate solution were mixed with 12 ml of 0.8 molar solution of the template of Example 1 in its hydroxide form (obtained by ion exchanging the salt in Example 1 on Bio-Rad ion-exchange resin AG1-X8, concentrating the eluent, and titrating the concentrate to determine molarity). 0.50 Grams of $Al_2(SO_4)_3.18H_2O$ were added and dissolved with mixing. The synthesis was carried out at the conditions described in Example 5. The $SiO_2:Al_2O_3$ mole ratio of the product, as determined by electron microprobe, was found to be 12:1. The X-ray diffraction pattern of the product is that of SSZ-19 as shown in Table 3.

TABLE 3

| 2 θ | d/n | Relavtive Intensity |
|---|---|---|
| 5.56 | 16.04 | 1 |
| 7.86 | 11.25 | 9 |
| 8.65 | 10.22 | 2 |
| 9.70 | 9.12 | 5 |
| 11.30 | 7.83 | 6 |
| 11.64 | 7.60 | 16 |
| 12.90 | 6.86 | 2 |
| 13.64 | 6.49 | 18 |
| 14.85 | 5.97 | 3 |
| 15.76 | 5.62 | 4 |
| 16.15 | 5.49 | 2 |
| 17.98 | 4.93 | 30* |
| 18.94 | 4.69 | 6 |
| 19.06 | 4.66 | 10 |
| 19.58 | 4.53 | 3* |
| 20.90 | 4.25 | 4 |
| 22.62 | 3.93 | 40 |
| 23.40 | 3.80 | 8 |
| 23.74 | 3.75 | 29 |
| 24.05 | 3.70 | 4 |
| 24.57 | 3.62 | 2 |
| 25.32 | 3.52 | 4 |
| 26.00 | 3.43 | 1 |
| 27.34 | 3.26 | 27* |
| 28.26 | 3.16 | 3 |
| 28.94 | 3.09 | 1 |
| 29.35 | 3.04 | 2 |
| 29.94 | 2.98 | 5 |
| 30.65 | 2.92 | 7 |

*Line is broad as a result of overlapping of two lines.

EXAMPLES 7-10

These are preparations of SSZ-19 carried out as described in Example 5 and as shown in Table 4.

TABLE 4

| Example: | 7 | 8 | 9 | 10 |
|---|---|---|---|---|
| First Solution | | | | |

TABLE 4-continued

| Example: | 7 | 8 | 9 | 10 |
|---|---|---|---|---|
| Sodium Silicate (g) | 5 gm | 5 gm | 5 gm | 5 gm |
| Template | Ex. 2 | Ex. 4 | Ex. 3 | Ex. 1 |
| Quantity (g) | 1.77 | 2.21 | 6.90 | 5 |
| $H_2O$ (ml) | 6 | 6 | 18 | 6 |
| Second Solution | | | | |
| $H_2O$ (ml) | 6 | 6 | 18 | 6 |
| $Al_2(SO_4)_3$ | 0.50 | 0.50 | 1.50 | 1.50 |
| Conc. NaOH (g) | 0.85 | 0.85 | 2.55 | 0.85 |
| Time (days) | 6 | 6 | 6 | 6 |
| Temp. (°C.) | 150 | 150 | 150 | 150 |
| Stirring rpm | 30 | 30 | 30 | 30 |
| XRD | SSZ-19 | 50% SSZ-19 + 50% analcite | SSZ-19 + analcite | SSZ-19 + analcite |

EXAMPLE 11

The hydrogen form of SSZ-19 was prepared from the SSZ-19 material described in Example 5. The Example 5 material was calcined in $N_2$/low air. The temperature was increased to 538° C. in 111° C. increments every 2 hours, and held at 538° C. for 8-10 hours. The calcined material was ion exchanged four times with aqueous $NH_4NO_3$ (2 hours at reflux for each exchange) and then calcined again as above to give $H^+$-SSZ-19. The X-ray diffraction lines are shown in Table 5.

TABLE 5

| 2 θ | d/n | Relative Intensity |
|---|---|---|
| 7.90 | 11.19 | 12 |
| 8.78 | 10.07 | 1 |
| 11.76 | 7.52 | 36 |
| 13.64 | 6.49 | 39 |
| 15.92 | 5.57 | 11 |
| 17.55 | 5.05 | 2 |
| 18.04 | 4.92 | 24 |
| 18.44 | 4.81 | 1 |
| 19.25 | 4.61 | 20 |
| 20.89 | 4.25 | 5 |
| 22.70 | 3.92 | 54 |
| 23.72 | 3.75 | 22 |
| 24.50 | 3.63 | 1 |
| 26.18 | 3.40 | 8 |
| 27.50 | 3.24 | 33* |
| 28.62 | 3.12 | 1 |
| 29.98 | 2.98 | 10 |
| 30.89 | 2.89 | 8 |

*Line is broad as a result of overlapping of two lines.

Using a Micromiretics Digisorb for analysis of $N_2$ absorption by the BET method, the surface area of the H-SSZ-19 of Example 11 was found to be 259 $m^2$/gm.

EXAMPLE 12

Absorption studies were carried out on the product of Example 11. A sample was left overnight at about 24° C. exposed to the ambient atmosphere at sea level. $H_2O$ absorption was 11.5% by weight after 24 hours. Another sample was tested for n-hexane absorption, in a Perkins Elmer TGS-2 Thermogravimetric System. The sample was evacuated and heated at 300° C. to 375° C. for 1-2 hours. It was then cooled to room temperature in a vacuum. The sample was subjected to increasing n-hexane vapor pressures (vacuum liquid equilibrium) from 0° C. to 24° C. After 48 hours, no n-hexane absorption was observed.

EXAMPLE 13

A sample of the catalyst of Example 11 was heated in a microreactor under helium to 425° C. A feed of n-hexane and 3-methylpentane (50% each by weight) was then passed in contact with the catalyst at 425° C. at an LHSV of 3 (based on ml of feed per gram of catalyst per hour). The conversion to lower boiling hydrocarbons was 1-2%.

What is claimed is:

1. A hydrocracking process which comprises contacting a hydrocarbonaceous feed in the presence of hydrogen at hydrocracking conditions with a catalyst comprising a crystalline solid having a mole ratio of an oxide selected from silicon oxide, germanium oxide, and mixtures thereof to an oxide selected from aluminum oxide, gallium oxide, and mixtures thereof greater than about 6:1 and having the X-ray diffraction lines of Table 1.

2. The hydrocracking process according to claim 1 wherein said hydrocracking conditions comprise a temperature ranging from about 175° C. to 485° C., a molar ratio of hydrogen to hydrocarbonaceous feed charge from 1 to 100, a pressure ranging from 0.5 to 350 bar, and a feed space velocity ranging from 0.1 to 30 V/Hr/V.

* * * * *